March 3, 1964    M. R. KRAMER    3,122,922
OPTICAL PRESSURE TRANSDUCER
Filed Jan. 19, 1961    2 Sheets-Sheet 1

INVENTOR.
MARTIN R. KRAMER
BY
ATTORNEY

United States Patent Office 3,122,922
Patented Mar. 3, 1964

3,122,922
OPTICAL PRESSURE TRANSDUCER
Martin R. Kramer, Jackson Heights, N.Y., assignor to United Aircraft Corporation, East Hartford, Conn., a corporation of Delaware
Filed Jan. 19, 1961, Ser. No. 83,772
4 Claims. (Cl. 73—398)

My invention relates to an optical pressure transducer and more particularly to a device which produces an electrical signal which is a measure of the pressure to which the device is subjected.

Many devices are known in the prior art for measuring pressure. Most of these devices rely on a mechanical displacement for the production of an indication of pressure. That is, upon the occurrence of a change in pressure, there results a measurable mechanical displacement which is some function of the pressure change. While these devices are satisfactory for most uses, they are relatively insensitive to high frequency pressure changes.

It is often desirable that there be produced an electrical signal which is a measure of or an indication of the magnitude of a pressure. Such a signal may for example be required for use in an electronic computor. With devices of the prior art which produce a mechanical displacement in response to a pressure change, a transducer must be employed to convert the mechanical displacement resulting from pressure into a useful electrical signal.

I have invented an optical pressure transducer which produces an indication of the magnitude of a pressure to which the device is subjected without requiring any measurable mechanical displacement. That is, my device is responsive to pressure directly rather than being responsive to a mechanical displacement produced by a pressure change. My transducer produces an electrical signal which indicates the magnitude of the pressure applied to the transducer without requiring a separate transducer for first converting a mechanical displacement into an electrical signal for later conversion of the signal into a sensible indication. My transducer has superior high frequency response over that of pressure responsive devices of the prior art.

One object of my invention is to provide an optical pressure transducer which measures force or pressure without requiring a measurable mechanical displacement.

Another object of my invention is to provide an optical pressure trnasducer having superior high frequency response to that of pressure responsive devices of the prior art.

Still another object of my invention is to provide an optical pressure transducer which produces an electrical signal indicative of pressure without requiring a separate transducer for first converting a mechanical displacement resulting from pressure into an electrical signal.

Other and further objects of my invention will appear from the following description.

In general my invention contemplates the provision of a pressure-responsive semiconductor through which I pass infrared radiation to a detector. I apply the pressure to be measured to the semiconductor. In one form of my invention the intensity of the detected radiation is an analogue function of the pressure to which the transducer is subjected. In another form of my invention the deviation of the beam of radiation emerging from the semiconductor affords a digital indication of the pressure being measured by the transducer.

In the accompanying drawings which form part of the instant specification and which are to be read in conjunction therewith and in which like reference numerals are used to indicate like parts in the various views.

Figure 1:
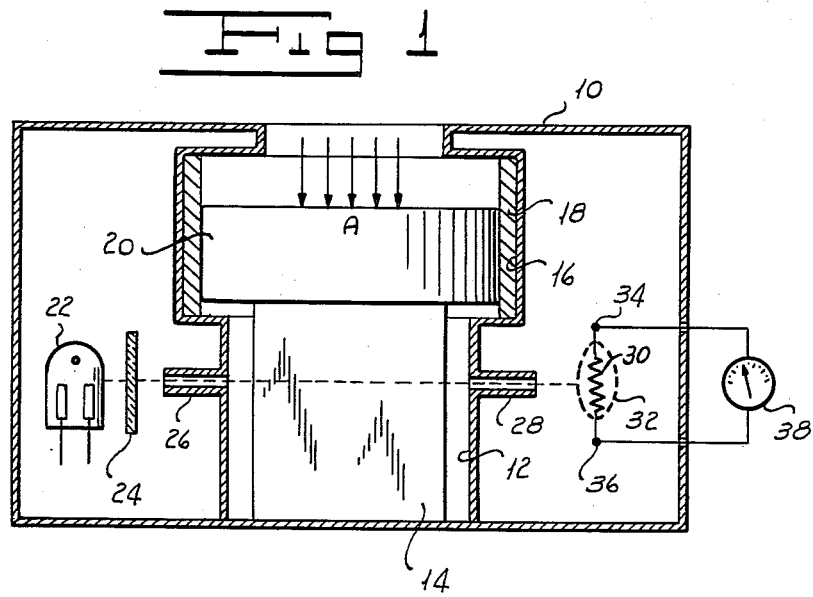
FIGURE 1 is a schematic view of one form of my optical pressure transducer.

Referring now more particularly to FIGURE 1 of the drawings, the form of my invention shown therein includes a housing 10 having a well 12 in which I place a semiconductor 14 which may, for example, be germanium or silicon or any other semiconductor exhibiting the characteristics to be described hereinbelow. I form a cylinder 16 within the housing 10 over the well 12 and dispose a bushing 18 within the cylinder 16. A piston 20 within the cylinder 16 is adapted to apply pressure to the semiconductor 14 in the direction of the arrow A. I dispose a source 22 of infrared radiation within the housing 10 at one side of the well 12 as viewed in FIGURE 1. The source 22 may be any suitable source of infrared radiation known to the art. For example, it may be an excited, gas-filled tube, the radiation of which passes through a filter 24. Alternatively, I may employ a monochromator, "silica pencil" or any other suitable source of infrared radiation such as an electrically heated wire the radiation of which is filtered to produce the required infrared radiation.

In the particular form of my invention shown in FIGURE 1, I have indicated the source 22 as being a gas-filled, excited tube having a filter 24 associated therewith. I provide the wall of the well 12 with an inlet conduit 26 through which a beam of radiation emerging from the filter 24 passes in entering the well 12. The beam entering the well through conduit 26 passes through the semi-conductor 14 and out through an exit conduit 28 formed in the wall of the well to impinge on the sensitive element 30 of a detector 32 having output terminals 34 and 36. The detector 32 may be of any suitable type known to the art which produces an electrical signal in response to infrared radiation impinging on its sensitive element. It may, for example, be a lead sulfide photoresistive cell or any other suitable form of photoconductive detector such, for example, as lead sulfide or lead telluride properly sensitized with a suitable impurity such, for example, as oxygen.

Figure 3:
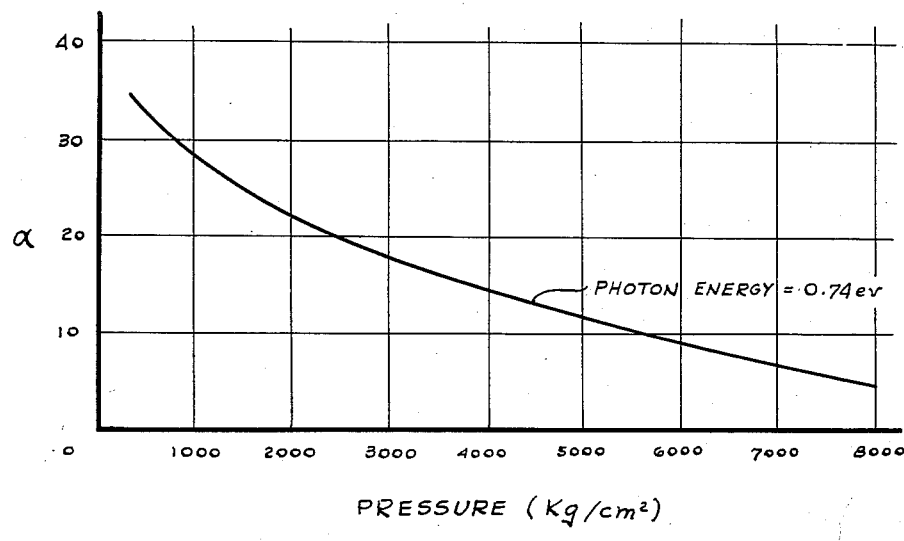
FIGURE 3 is a graph showing the variation in the absorption coefficient of germanium with changes in pressure.

Referring now to FIGURE 3, there is shown a curve representing the variation in the absorption coefficient of germanium for a particular energy level of radiation as the pressure applied to the semiconductor is varied. As can be seen by reference to the figure, as the pressure applied to the semiconductor increases, its absorption coefficient decreases so that more radiation is transmitted. It has been discovered that germanium demonstrates the properties illustrated by the curve of FIGURE 3 in the infrared band of the spectrum and that the effect also is possible in the near infrared or low red visible band of the spectrum. It has been discovered that silicon demonstrates similar properties. From the curve of FIGURE 3, it will be appreciated that as the pressure applied to the semiconductor 14 by the piston 10 increases the amount of radiation transmitted by the semiconductor increases. Thus, the electrical signal appearing at the terminals 34 and 36 of the detector 32 increases with an increase in pressure to provide a measure of the pressure applied to the semiconductor 14 by the piston 20. By properly calibrating an output indicator such, for example, as a meter 38 connected to the terminals 34 and 36 a direct measure of the pressure can be obtained.

As is pointed out hereinabove I may use any other suitable form of infrared source in place of the gas-filled cell 22. Similarly, other forms of detector than the cell 32 may be employed. While I have shown a piston 20 as being the means for applying pressure to the semiconductor 14, it will be apparent that I may provide any other means for transmitting pressure to the semiconductor. For example, as will be apparent from the description of the alternate form of my invention given beolw, the transducer shown in FIGURE 1 could be arranged to measure hydrostatic pressure.

Figure 2:
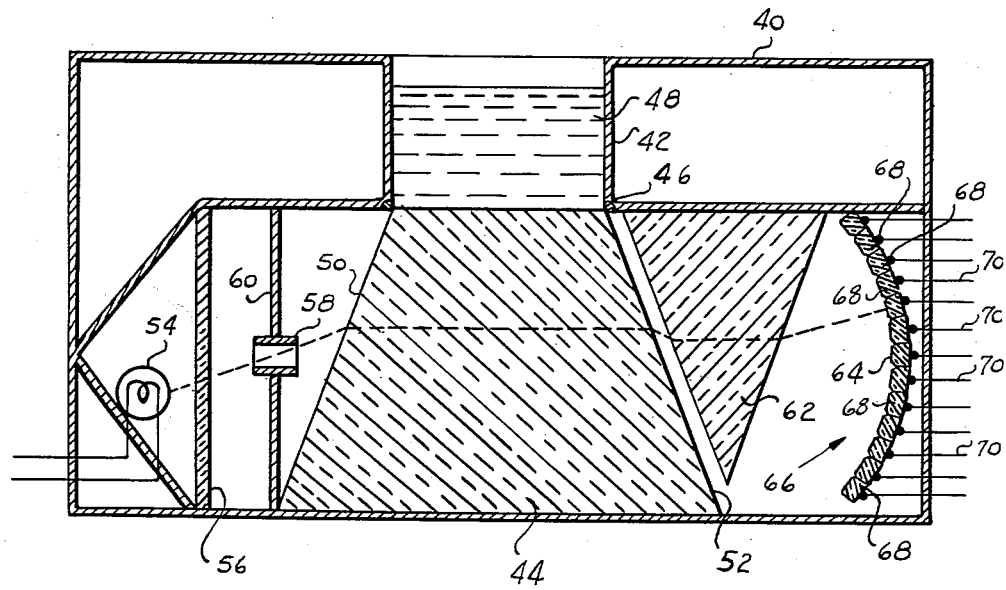
FIGURE 2 is a schematic view of an alternate form of my optical pressure transducer.

Referring now to FIGURE 2, the alternate form of my transducer comprises a housing 40 formed with a well 42, the bottom of which is closed by the upper surface of semiconductor 44 formed of a material such as germanium or silicon. I provide a suitable seal 46 around the bottom of the well 42 to permit the well to receive a liquid 48, the pressure of which is to be measured by the device. I form the semiconductor 44 to have converging entrance and exit faces 50 and 52. A suitable source 54 of infrared radiation such, for example, as an electrically heated wire passes radiation through a filter 56 and through an aperture 58 carried by a support 60 toward the entrance face 50 of the semiconductor 44. After passing through the semiconductor 44 the beam of radiation emerges from the exit face 52 and passes through an orienting prism 62 from whence the beam passes to the surface 64 of a device indicated generally by the reference character 66 made up of a plurality of photosensitive elements 68. When the beam impinges on one of the elements 68, an output conductor 70 associated with the element carries an electrical signal.

Figure 4:
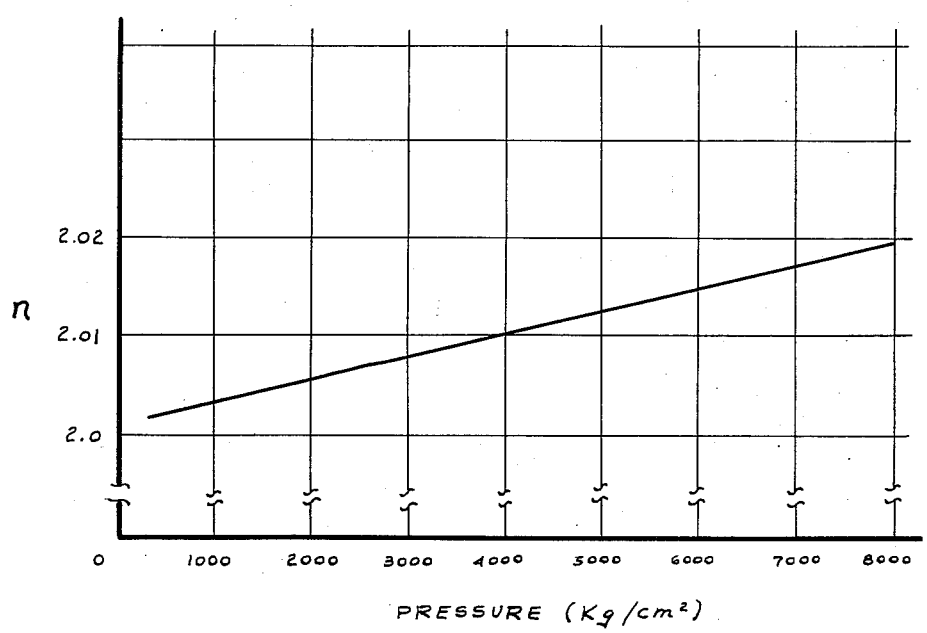
FIGURE 4 is a graph illustrating the change in the refractive index of a semiconductor with pressure.

Referring now to FIGURE 4, I have shown the variation of the index of refraction of a semiconductor material such as germanium or silicon with variation in pressure. As can be seen by reference to FIGURE 4, as the pressure increases, the index of refraction also increases from its normal value. Thus, it will be apparent that in the form of my invention shown in FIGURE 2, the particular sensitive element 68 which is activated by the beam passing through semiconductor 44 is determined by the pressure to which the semiconductor is subjected. It will thus be clear this form of my invention produces an output signal in digital form which determines the pressure applied to the semiconductor.

In operation of the form of my invention shown in FIGURE 1, a certain percentage of the radiation from source 22 passing through the semiconductor 14 is absorbed by the semiconductor. The coefficient of absorption is a measure of the amount of radiation absorbed. After passing through the semiconductor, the beam activates the detector 32 to cause it to produce an output signal. The strength of the signal depends upon the amount of radiation striking the detector. It will be apparent that as the pressure applied to the semiconductor increases the coefficient of absorption decreases so that the output signal of the detector 32 increases. By proper calibration of meter 38 or any other suitable indicating means the electrical signal from the detector 32 may be made to provide an indication of pressure.

In the form of my transducer shown in FIGURE 2, the beam of radiation from source 54 is deflected in the course of its passage through the semiconductor 44 by an amount determined by the index of refraction of the semiconductor material. This index of refraction varies with changes in pressure, becoming larger as the pressure increases. Owing to these facts, as the pressure increases, the beam of radiation moves downwardly as viewed in FIGURE 2 on the surface of detector 66 to activate a lower one of the sensitive elements 68 to cause its associated output conductor 70 to carry a signal which is a digital representation of the pressure being applied to the semiconductor.

It will be seen that I have accomplished the objects of my invention. I have provided an optical pressure transducer which does not require for its operation any measurable mechanical displacement. My optical transducer provides an electrical output signal in response to change in pressure without the necessity of employing a transducer which converts a measurable mechanical displacement into an electrical signal. My transducer has excellent high frequency response.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An optical transducer including in combination a semiconductor the coefficient of absorption of which varies in response to pressure applied thereto, means for applying pressure to said semiconductor, a source of radiation positioned to direct radiation through said semiconductor and means responsive to radiation from said source passing through said semiconductor for indicating the pressure applied to said semiconductor.

2. An optical transducer including in combination a semiconductor the index of refraction of which varies in response to pressure applied thereto, means for applying pressure to said semiconductor, a source of radiation positioned to direct radiation through said semiconductor and means responsive to radiation from said source passing through said semiconductor for indicating the pressure applied to the semiconductor.

3. An optical transducer including in combination a semiconductor the coefficient of absorption of which varies in response to pressure applied thereto, means for applying pressure to said semiconductor, a source of infrared radiation positioned to direct infrared radiation through said semiconductor and means responsive to infrared radiation from said source passing through said semiconductor for producing an analogue signal representing the pressure applied to the semiconductor.

4. An optical transducer including in combination a semiconductor the index of refraction of which varies in response to pressure applied thereto, means for applying pressure to said semiconductor, a source of radiation positioned to direct radiation through said semiconductor and means responsive to radiation from said source passing through said semiconductor for producing a digital signal representing the pressure applied to the semiconductor.

References Cited in the file of this patent

UNITED STATES PATENTS

| 2,415,436 | Maris | Feb. 11, 1947 |
| 2,977,477 | Rosi et al. | Mar. 28, 1961 |

FOREIGN PATENTS

| 830,313 | Great Britain | Mar. 16, 1960 |